United States Patent [19]

Savoca

[11] Patent Number: 4,827,422
[45] Date of Patent: May 2, 1989

[54] FAN SCAN HORIZON SENSOR FOR A SPIN STABILIZED SATELLITE

[75] Inventor: Robert C. Savoca, Ridgefield, Conn.
[73] Assignee: Barnes Engineering Company, Shelton, Conn.
[21] Appl. No.: 937,907
[22] Filed: Dec. 4, 1986
[51] Int. Cl.$^4$ ............................................... B64G 1/36
[52] U.S. Cl. .................................... 364/459; 356/147; 364/434
[58] Field of Search ............... 364/455, 459, 443, 434; 250/347; 342/355; 356/141, 147

[56] References Cited

U.S. PATENT DOCUMENTS

| | | | |
|---|---|---|---|
| 4,071,211 | 1/1978 | Muhlfelder et al. | 364/434 |
| 4,328,421 | 5/1982 | Falkel | 250/347 |
| 4,521,855 | 6/1985 | Lehner et al. | 364/434 |
| 4,617,634 | 10/1986 | Izumida et al. | 364/455 |
| 4,628,206 | 12/1986 | Astheimer | 250/372 |

Primary Examiner—Parshotam S. Lall
Assistant Examiner—Thomas G. Black
Attorney, Agent, or Firm—Parmelee, Bollinger & Bramblett

[57] ABSTRACT

Three axis attitude information is provided by a horizon sensor for a spin stabilized satellite having an optical system on the spinning member viewing normal to the spin axis with a linear array of detectors in its focal plane which scans a zone around the earth. The detectors are self scanned and sensitive to visible and UV light and respond to the sun illuminated crescent of the earth, moon, stars or other illuminated bodies. Accordingly, a linear array of detectors mounted on a rotating portion of the satellite views a line in space which scans a zone on the celestial sphere and from the position of two celestial objects within this zone such as the earth and the sun, and the known time, pitch, roll and yaw can be established. The system also has an automatic alignment feature in which the array can be accurately aligned with the spin axis and any misalignment can be determined from orbital data and corrections made in flight. With the wide 360° scan it is not necessary to sense the earth to determine attitude and having knowledge of the time and ephemeris data the position of any two objects such as the sun and the moon, a star or a planet is sufficient.

6 Claims, 2 Drawing Sheets

FAN SCAN HORIZON SENSOR FOR A SPIN STABILIZED SATELLITE

BACKGROUND OF THE INVENTION

This invention relates to an improved, no moving parts horizon sensor, and more particularly, to such a single sensor having no moving parts which will give complete roll, pitch and yaw information on every revolution of the satellite.

Most unmanned satellites employ horizon sensors which are mounted therein and used for attitude control and guidance of the satellite. The attitude of the satellite is determined by its position with respect to three axes at right angles to each other. Two of these axes are in a plane at right angles to a projected radius of the earth passing through the satellite and the third axis coincides with such radius. The plane in which the first two axes lie is parallel to the earth's horizon and once the orientation of the satellite with respect to these two axes is determined, orientation around the other axis can be determined utilizing other means such as gyroscopes or observation of other heavenly bodies. Horizon sensors utilize the line of thermal discontinuity between the earth's atmosphere and outer space which line is characterized by a large differential in infrared radiation between outer space which provides little such radiation and the earth which is considerably warmer. This characteristic is utilized by scanning an infrared detector in a conical scan pattern across the horizon and deriving electrical output signals marking the line of discontinuity. Reference pulses are also generated as the scan passes predetermined points in the vehicle. The intervals between the crossings and the reference pulses are compared to produce an output signal which produces information with respect to the attitude of the vehicle with respect to the horizon. A very successful horizon sensor shown and described in U.S. Pat. No. 3,020,403 to Merlin which is assigned to the Assignee of the present invention provides such a conical scan pattern but requires two or more sensors mounted in the satellite to provide the two axis information. U.S. Pat. No. 4,328,421 to Falbel, which is assigned to the Assignee of the present invention, provides a horizon sensor with only one set of optics and one scanning element and only one detector for two axis information with the entire sensor being housed in one package.

The problem with such sensors is that they either require more than one sensor or moving scanning elements which add to the weight, cost and power requirements which are precious commodities on orbiting satellites.

In an application Ser. No. 644,549 filed Aug. 27, 1984, now U.S. Pat. No. 4,628,206, to Robert Astheimer entitled VISIBLE UV HORIZON SENSOR, a sensor is provided which overcomes some of these problems. However, it is not applicable to a spinning satellite and only two axis information is provided.

SUMMARY OF THE INVENTION

Accordingly, it is an object of this invention to provide a new and improved horizon sensor which is capable of providing three axis information with no moving parts.

Still a further object of this invention is to provide a new and improved horizon sensor which utilizes a single sensor for providing three axis information.

Another object of this invention is to provide a new and improved horizon sensor for use on spin stabilized satellites which is low in cost and high in accuracy.

Still a further object of this invention is to provide a new improved method for providing three axis attitude information utilizing a single sensor on a spin stabilized satellite.

In carrying out this invention in one illustrative embodiment thereof, a sun earth horizon sensor for spin stabilized satellites has a single detector array responsive to predetermined visible and ultra-violet spectral bands which detector array is adapted to be mounted in a spinning satellite orbiting the earth thereby scanning the detector array in a 360° scan zone around the earth of predetermined width which zone includes the earth, sun, moon, star or other celestial bodies. A lens system is provided for directing the field of view of the symmetrical detector array over a fan-shaped field projected in space forming the scan zone and applying the radiation received therefrom to the detector array. The signals from the detector array are electronically self scanned to produce a time sequence of electrical signals from the individual elements of the array in response to the intensity of radiation received from the 360° field of view of the array. A computer is provided in which the electrical signals from the detector array are stored and processed. The computer includes stored ephemeris data and computes roll, pitch and yaw information.

Advantages of the present invention are that a no moving parts sensor is provided which has a single detector array which is self scanned and provides therefrom in combination with a computer three axis information without using additional detectors, optics, or other scanning mechanisms.

BRIEF DESCRIPTION OF THE DRAWINGS

The invention, together with further objects, aspects, features and advantages thereof from the following description taken in conjunction with the accompanying drawings which are presented in diagrammatical form to more clearly describe the principles and operation of the invention.

DESCRIPTION OF THE PREFERRED EMBODIMENTS

Figure 1:
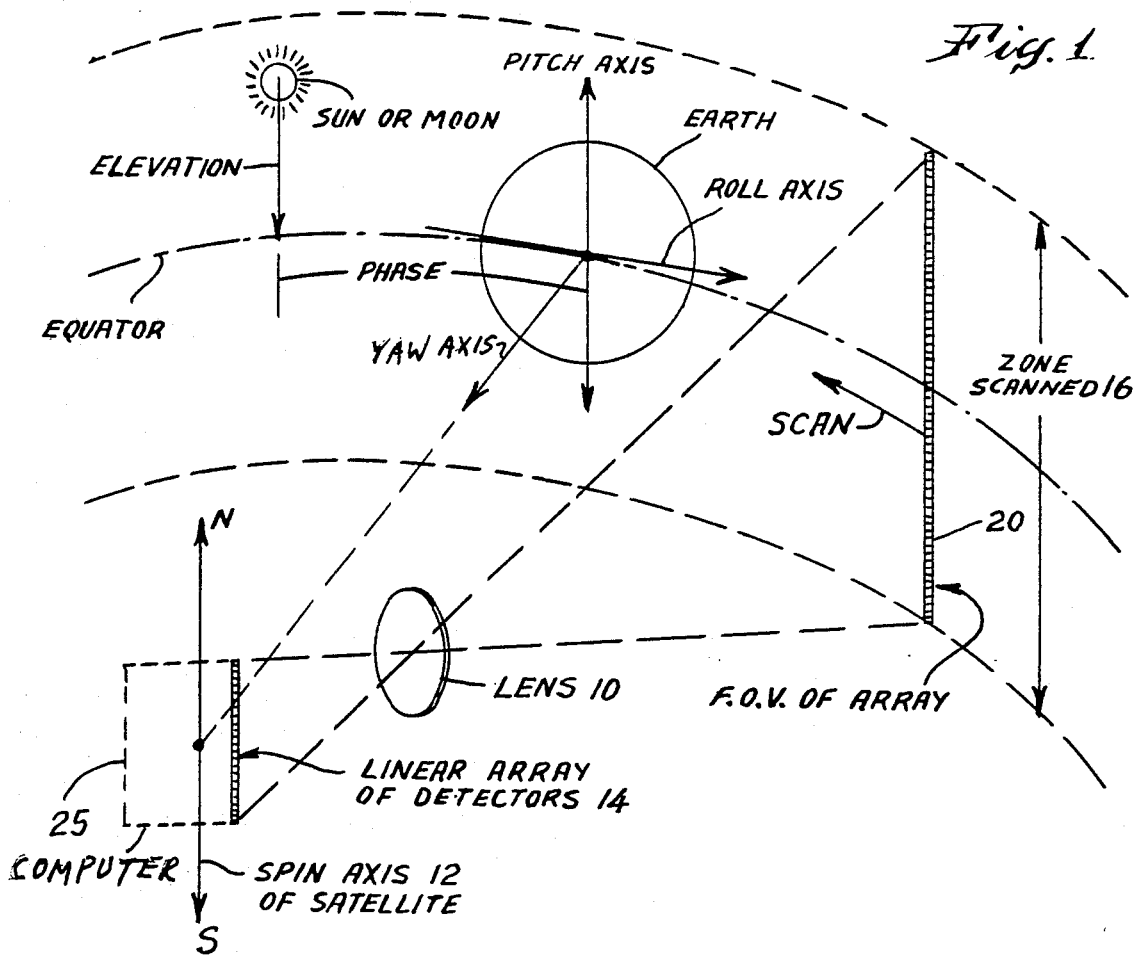
FIG. 1 is a diagrammatic illustration of a horizon sensor in accordance with the present invention illustrating an optical system on a spinning member of a spin stabilized satellite viewing normal to the spin axis with a linear array of detectors in the focal plane thereby scanning a zone around the celestial sphere which includes the earth and sun or moon.

In earth orbiting geosynchronous satellites at a geosynchronous attitude of 22,000 miles, the earth subtends 17.5°. Some of these geosynchronous satellites are spin stabilized having the axis of rotation of the spinning member oriented parallel to the earth's axis. Accordingly, in accordance with the present invention an optical system illustrated as a lens 10 in FIG. 1 mounted on the spinning member depicted as the spin axis 12 of a satellite viewing normal to the spin axis with a linear array of detectors 14 in the focal plane of the optical system 10 as shown in FIG. 1, will scan a zone 16 around a celestial sphere. The sun will always lie within plus or minus 23½° of the equator, and accordingly, if the linear detector array 14 subtends at least 47° centered around the equator, the detector array 14 will always scan across the sun and the entire earth on every revolution of the spinning satellite. However, this concept is not limted to satellites orbiting at synchronous altitudes but is applicable to both lower and higher altitudes as well. Even at altitudes where the earth subtends more than the length of the linear detector array 14, attitude information can be derived as explained herein after.

The linear detector array 14 mounted on a rotating portion of the satellite whose attitude is to be determined views a line 20 in space through the lens 10 indicated as the field of view of the array on FIG. 1 which scans a zone 16 on the celestial sphere. Knowing the particular time in the revolution of the satellite and from the position of the sun and the earth within the scan zone 16, pitch, roll and yaw can be established. A principle feature of this system that a single sensor with no moving parts can give complete roll, pitch and yaw information on every revolution of the satellite. The pitch, roll and yaw axes are illustrated in reference to the earth and are shown in FIG. 1. Roll is derived from the elevation of the earth within the detector array 14 and pitch from the phase between the earth's signal and a reference on a non-spinning part of the satellite for example, in an antenna on the satellite which is continually directed toward the earth. Yaw information cannot be derived from the earth's signal alone and employs some other body such as the sun, moon or a star whose position in the celestial sphere with respect to the earth is known. This information may be provided from an ephemeris which information may be stored in a computer 25 mounted on the satellite to which the detector signals from the linear detector array are provided or the ephemeris data may be transmitted to the satellite via communication links. Yaw is obtained from the elevation and phase of the celestial body chosen which is scanned within the zone such as the sun, moon star or other planet with respect to the earth. When the earth eclipses the sun, the earth's center may be determined from the halo surrounding the earth due to scattered blue and UV radiation as described in the aforesaid patent application Ser. No. 644,549. It should be pointed out that with the wide 360° scan coverage of the celestial sphere which may be termed "fan scan" to describe the scan pattern of the linear detector array it is not necessary to sense the earth to determine attitude. Having the knowledge of time in a particular scan and the ephemeris data, the position of any two objects such as the sun and the moon, a star or other planet is sufficient to provide the three axis information. However, in order to determine the attitude, the array 14 should be accurately aligned with the spin axis. As will be shown, any misalignment can be determined from the orbital data and appropriate corrections applied.

Figure 2:
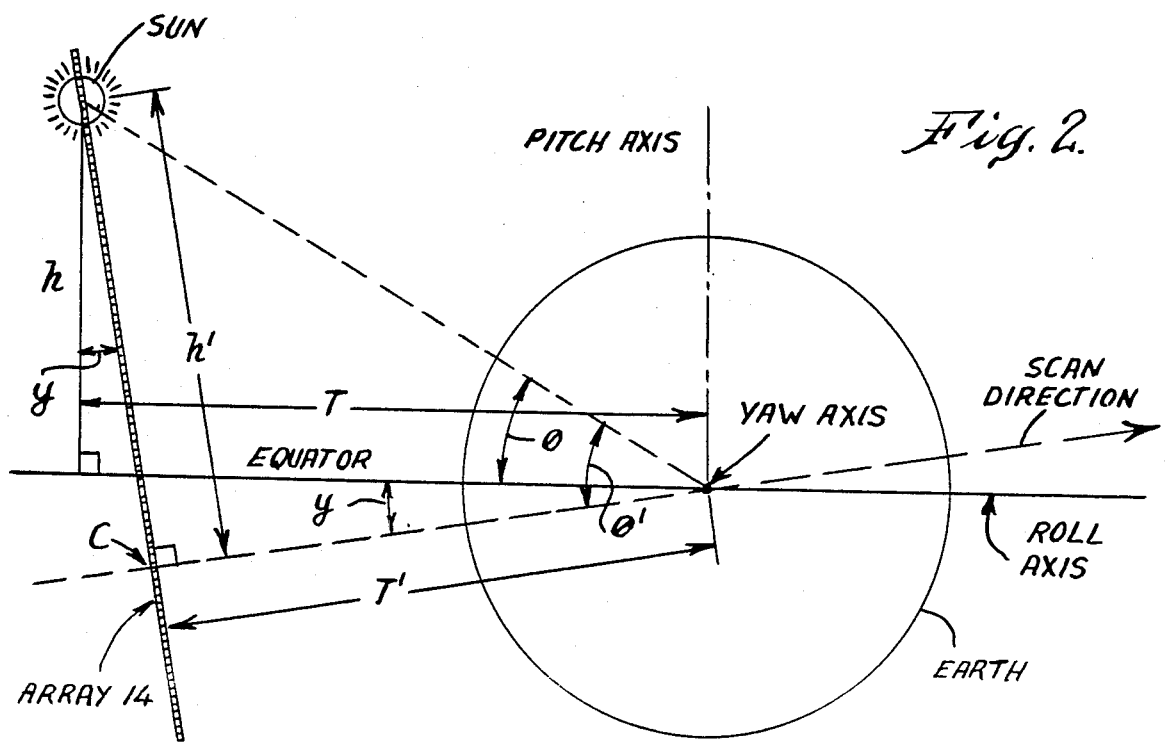
FIG. 2 is a diagrammatic illustration of a linear detector array mounted on a rotating portion of the satellite which views a line in space thereby scanning a zone on the celestial sphere, the geometry of which is shown of the scan motion with the pitch, roll and yaw axis indicated.

FIG. 2 shows the geometry of the scan motion with the pitch, roll and yaw axes indicated. Roll is determined by comparison of the pulse width signals of detector elements equidistant on opposite sides of the center element "C" of the array. Pitch is determined by the phase of the earth signal with respect to some reference located on the non-spinning part of the space-craft. Yaw cannot be determined from earth alone and signals from the sun, moon or stars are required.

FIG. 2 shows a sun signal being received by the array at an elevation h' above the center element C, and an hour angle (or time interval) T' before the meridian. From ephemeris data, the elevation and hour angle with respect to the equator are h and T. The discrepancies between h and h' and T and T', are due to the yaw y. From FIG. 2 and noting that the triangles containing h, T and h', T' are right spherical triangles:

$$y = \phi' - \phi = \arctan\left(\frac{\tan h'}{\sin T'}\right) - \arctan\left(\frac{\tan h}{\sin T}\right) \quad \text{(Eq. 1)}$$

Figure 3:
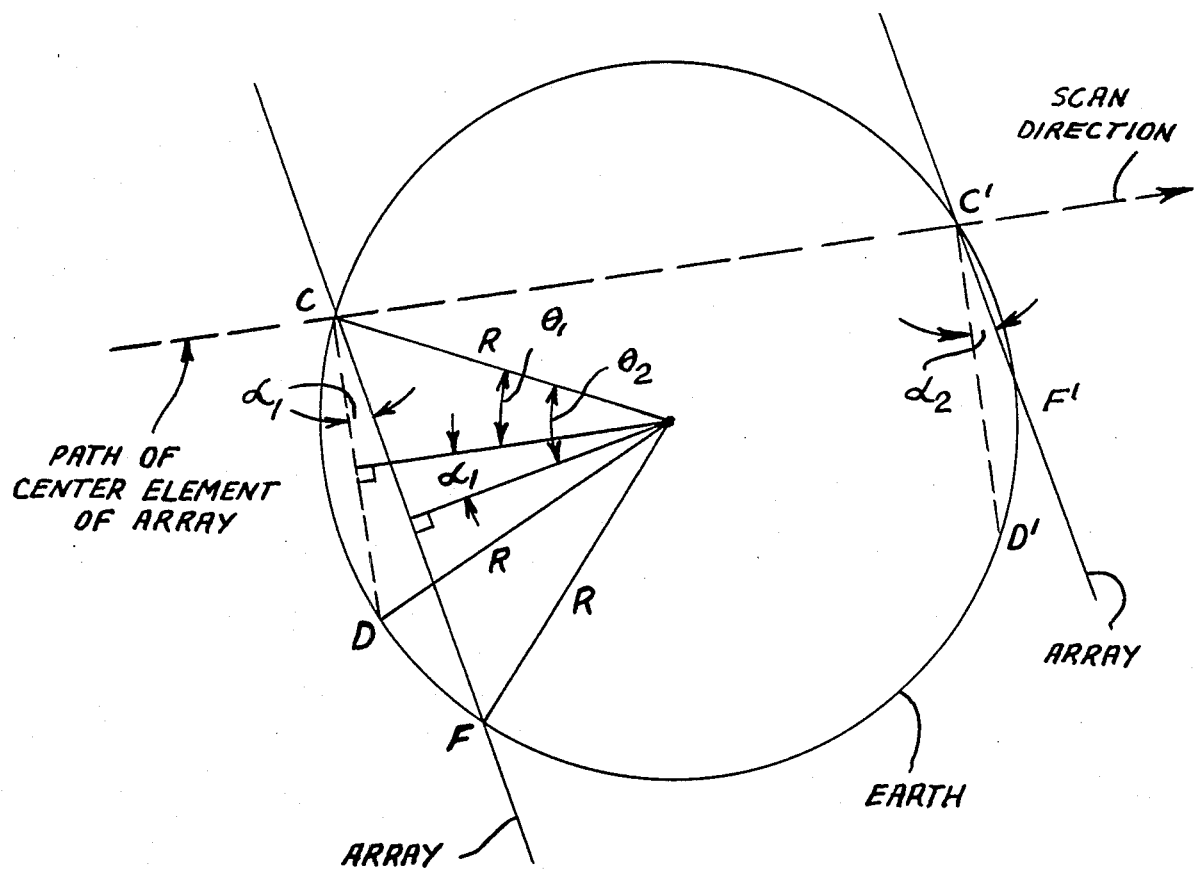
FIG. 3 is a diagrammatic illustration of a method for determining a misalignment between the detector array and the spin axis which misalignment can be determined from the orbital data permitting corrections to be made in flight in accordance with the present invention.

The method of determining a misalignment $\alpha$ between the array and the spin axis is shown in FIG. 3. $\overline{CF}$ is the intersection of the array with the earth as the center element C just crosses the horizon, while $\overline{C'F'}$ is the corresponding intersection on the opposite side. $\overline{CD}$ and $\overline{C'D'}$ are the equal intersections that would occur if there were no alignment error, i.e., $\alpha = 0$. For the incident intersection:

$$\alpha_1 = \phi_2 - \phi_1 = \arcsin\left(\frac{\overline{CF}}{2R}\right) - \arcsin\left(\frac{\overline{CD}}{2R}\right)$$

For the departing intersection:

$$\alpha_2 = \arcsin\left(\frac{\overline{CD}}{2R}\right) - \arcsin\left(\frac{\overline{CF}}{2R}\right)$$

Since $\overline{CD} = \overline{C'D'}$ $$\alpha = \frac{\alpha_1 + \alpha_2}{2} = \tfrac{1}{2}\arcsin\left(\frac{\overline{CF}}{2R}\right) - \tfrac{1}{2}\arcsin\left(\frac{\overline{CF}}{2R}\right).$$

It is reasonable to expect the misalignment to be small and therefor to replace the angle with its sine. Then:

$$\alpha = \frac{\overline{CF} - \overline{CF}}{4R} \quad \text{(Eq. 2)}$$

CF and C' F' are both measured on each scan and R is known. It should be noted that this measurement of alignment error is independent of any roll, pitch or yaw that may be present. This is important since the misalignment angle $\alpha$ must be used to correct pitch and yaw, and it would complicate matters if knowledge of these was necessary to calculate $\alpha$. The correction is very easy to apply and amounts to adding or subtracting a quantity (n w sin $\alpha$) to the phase measurement T, made by any detector element n where:

n = Number of elements above or below the center element C
w = Element spacing

There would also be a correction to h measurements but this is proportional to cos $\alpha$ and for small values of $\alpha$ is negligible.

There is no cross coupling between pitch and roll in the absence of yaw, but there is cross coupling between all three when yaw is present. This always occurs, since 90° of yaw converts pitch to roll and vice versa.

The detectors are preferably a self-scan linear array which are sensitive to visible light and would also respond to the sun or the illuminated crescent of the earth as well as radiation from any of the bodies covered in the ephemeris data stored in the onboard computer or relayed thereto by an earth communication link. The location of the center of the earth would be calculated from the crescent data as well as the known diameter to the earth by the computer 25 to which detector signals of the linear array 14 are fed. In an illustrative embodiment a typical implementation of the present invention could employ an EGG-Reticon RL-4096-20 self-scanned silicon detector array. This detector array has 4096 detector elements, each 0.015 mm high (in the direction of the array) and 0.508 mm wide. This detector array would be mounted in the focal plane of a 44 mm diameter, f/1.5 lens and the system would spin at 1 rps. Such an array would then subtend 50° with each element subtending 0.012°×0.413°. The radiation signals of the array of detectors would be read out once every 1.15 msec and processed on the onboard microprocessor 25.

As will be seen, the sensor for the spin stabilized satellite in accordance with the present invention provides a system having a single horizon sensor with no moving parts which will give complete roll, pitch and yaw information on every revolution of the satellite. Not only that, but with a wide 360° scan coverage, it is not even necessary to sense the earth to determine the attitude of the vehicle as the position of any two objects within the scan zone such as the sun, moon star of another planet is sufficient. In addition, any misalignment of the spin axis can be determined from orbital data and corrected. Accordingly, an automatic alignment arrangement is also provided in the present system increasing accuracy and insuring the provision of three axis information.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. A horizon sensor for a spin-stabilized satellite having a spin axis for providing three axis attitude information (roll, pitch and yaw) from a single detector array comprising:

a single detector array having a plurality of individual detector elements responsive to predetermined visible and ultraviolet spectral bands, said detector mounted in a spinning satellite orbiting the earth for scanning said detector array through a 360° scan zone of predetermined width around the earth which will include in the scan zone the sun, moon, star or other planet, optical means mounted in a fixed position with respect to said detector array on said spinning satellite for directing the field of view of said detector array over a fan-shaped scan path projected in space parallel to the spin axis forming said scan zone from said detector array by the rotation of said spinning satellite and passing radialtion received therefrom to said detector array, means for scanning said plurality of individual detector elements of said detector array for generating electrical signals from the individual elements of said array in response to the intensity of radiation received from the 360° field of view of said array which electrical signals are used for providing three axis attitude information.

2. The horizon sensor as claimed in claim 1, wherein said detector array is linear.

3. The horizon sensor as claimed in claim 1, wherein said detector array is self-scanned.

4. The horizon sensor as claimed in claim 1, wherein said plurality of individual detector elements has a center element and the difference in the earth subtense on said detector array when the center element of said detector array just crosses the earth horizon is used to correct for misalignment of the array with respect to the spin axis.

5. The method for deriving electrical signals used in determining three axis information (roll, pitch and yaw) for a spin-stabilized satellite orbiting the earth comprising:

mounting an optical system on a spinning member of a spin-stabilized satellite having a spin axis with the optical system viewing normal to the spin axis, positioning a linear detector array having a plurality of individual detector elements with a center element which is sensitive to visible and ultraviolet radiation and responds to celestial objects such as the earth, the sun illuminated crescent, moon, stars or other illuminated bodies, in the focal plane of said optical system, scanning said linear detector array which views a line in space by the rotation of said spinning member and scans a wide 360° fan scan on a celestial sphere containing at least two celestial objects, self-scanning said linear detector array for generating electrical signals from the individual detector elements of said linear detector array in response to the intensity of radiation received from said wide 360° scan zone of said array, and utilizing said electrical signals derived from scanning said array over at least two celestial objects in said scan zone to determine the attitude of said spin-stabilized satellite with respect to the earth.

6. The method as claimed in claim 5 including the step determining misalignment of the linear detector array and the spin axis using the difference in the earth subtense on said detector array when said center element of said detector array crosses the earth's horizon and correcting any misalignment.

* * * * *